(12) United States Patent
Atherton et al.

(10) Patent No.: US 8,924,644 B2
(45) Date of Patent: Dec. 30, 2014

(54) EXTENDING CACHE IN A MULTI-PROCESSOR COMPUTER

(75) Inventors: William E. Atherton, Hillsborough, NC (US); Marcus A. Baker, Apex, NC (US); Sreekanth Konireddygari, Morrisville, NC (US); Jeffrey B. Williams, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 395 days.

(21) Appl. No.: 13/338,804

(22) Filed: Dec. 28, 2011

(65) Prior Publication Data

US 2013/0173958 A1 Jul. 4, 2013

(51) Int. Cl.
G06F 12/00 (2006.01)
G06F 13/00 (2006.01)
G06F 13/28 (2006.01)
G06F 12/08 (2006.01)

(52) U.S. Cl.
CPC .......... G06F 12/084 (2013.01); G06F 12/0842 (2013.01)
USPC ........................................ 711/118; 711/145

(58) Field of Classification Search
CPC ... G06F 12/084; G06F 12/0842; G06F 11/14; G06F 9/50
USPC ................................. 711/118, 145
See application file for complete search history.

(56) References Cited

U.S. PATENT DOCUMENTS

| | | | |
|---|---|---|---|
| 6,871,264 B2 | 3/2005 | Soltis, Jr. | |
| 7,076,609 B2 | 7/2006 | Garg et al. | |
| 7,305,523 B2 | 12/2007 | Guthrie et al. | |
| 7,987,321 B1 | 7/2011 | Agarwal et al. | |
| 2004/0059875 A1 | 3/2004 | Garg et al. | |
| 2009/0164731 A1* | 6/2009 | Le et al. | 711/130 |
| 2010/0174752 A1* | 7/2010 | Kimmel et al. | 707/791 |
| 2011/0040940 A1 | 2/2011 | Wells et al. | |
| 2011/0093687 A1 | 4/2011 | Chen et al. | |

OTHER PUBLICATIONS

Chang et al., "Cooperative Caching for Chip Multiprocessors", In Proceedings of International Symposium on Computer Architecture (ISCA-33), Jun. 17-21, 2006, pp. 264-276, IEEE Computer Society, USA.

* cited by examiner

Primary Examiner — Matthew Bradley
Assistant Examiner — Rocio Del Mar Perez-Velez
(74) Attorney, Agent, or Firm — Edward J. Lenart; Katherine S. Brown; Biggers Kennedy Lenart Spraggins LLP

(57) ABSTRACT

Methods, apparatuses, and computer program products of extending cache in a multi-processor computer are provided. Embodiments include detecting, by a donor processor, non-use of a donor processor's cache; broadcasting to one or more processors in the multi-processor computer, by the donor processor, a donor-ready message indicating the donor processor's cache is available for ownership transferment; receiving from a first requesting processor, by the donor processor, a first ownership-request message requesting ownership of the donor processor's cache by the first requesting processor; transmitting to the first requesting processor, by the donor processor, an ownership-grant message indicating an intention of the donor processor to transfer ownership of the donor processor's cache to the first requesting processor; and receiving from the first requesting processor, by the donor processor, an ownership-claim message indicating that the first requesting processor intends to claim ownership of the donor processor's cache.

22 Claims, 9 Drawing Sheets

EXTENDING CACHE IN A MULTI-PROCESSOR COMPUTER

BACKGROUND OF THE INVENTION

1. Field of the Invention

The field of the invention is data processing, or, more specifically, methods, apparatuses, and computer program products for extending cache in a multi-processor computer.

2. Description Of Related Art

For improved performance and scalability, processors within a multi-processor computer may be interconnected, such as by a point-to-point high-speed bus. In such architectures, each processor package typically has a dedicated point-to-point connection to another processor package and also to a set of memory modules. To reduce the silicon footprint of the memory modules, the cache memories may have limited capacity. Such capacity limitations on the amount of data a cache can store could potentially lead to increased cache misses resulting in a significant performance loss. The primary contributor to the performance loss is increased latency time to access the computer's memory in the event of a cache miss. As such, the utilization of the space available in the cache memories of the processors directly impacts the performance of the multi-computer system.

SUMMARY OF THE INVENTION

Methods, apparatuses, and computer program products of extending cache in a multi-processor computer are provided. Embodiments include detecting, by a donor processor, non-use of a donor processor's cache; broadcasting to one or more processors in the multi-processor computer, by the donor processor, a donor-ready message indicating the donor processor's cache is available for ownership transferment; in response to the broadcast of the donor-ready message, receiving from a first requesting processor, by the donor processor, a first ownership-request message requesting ownership of the donor processor's cache by the first requesting processor; in response to receiving the first ownership-request message, transmitting to the first requesting processor, by the donor processor, an ownership-grant message indicating an intention of the donor processor to transfer ownership of the donor processor's cache to the first requesting processor; and in response to transmitting the ownership-grant message, receiving from the first requesting processor, by the donor processor, an ownership-claim message indicating that the first requesting processor intends to claim ownership of the donor processor's cache.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
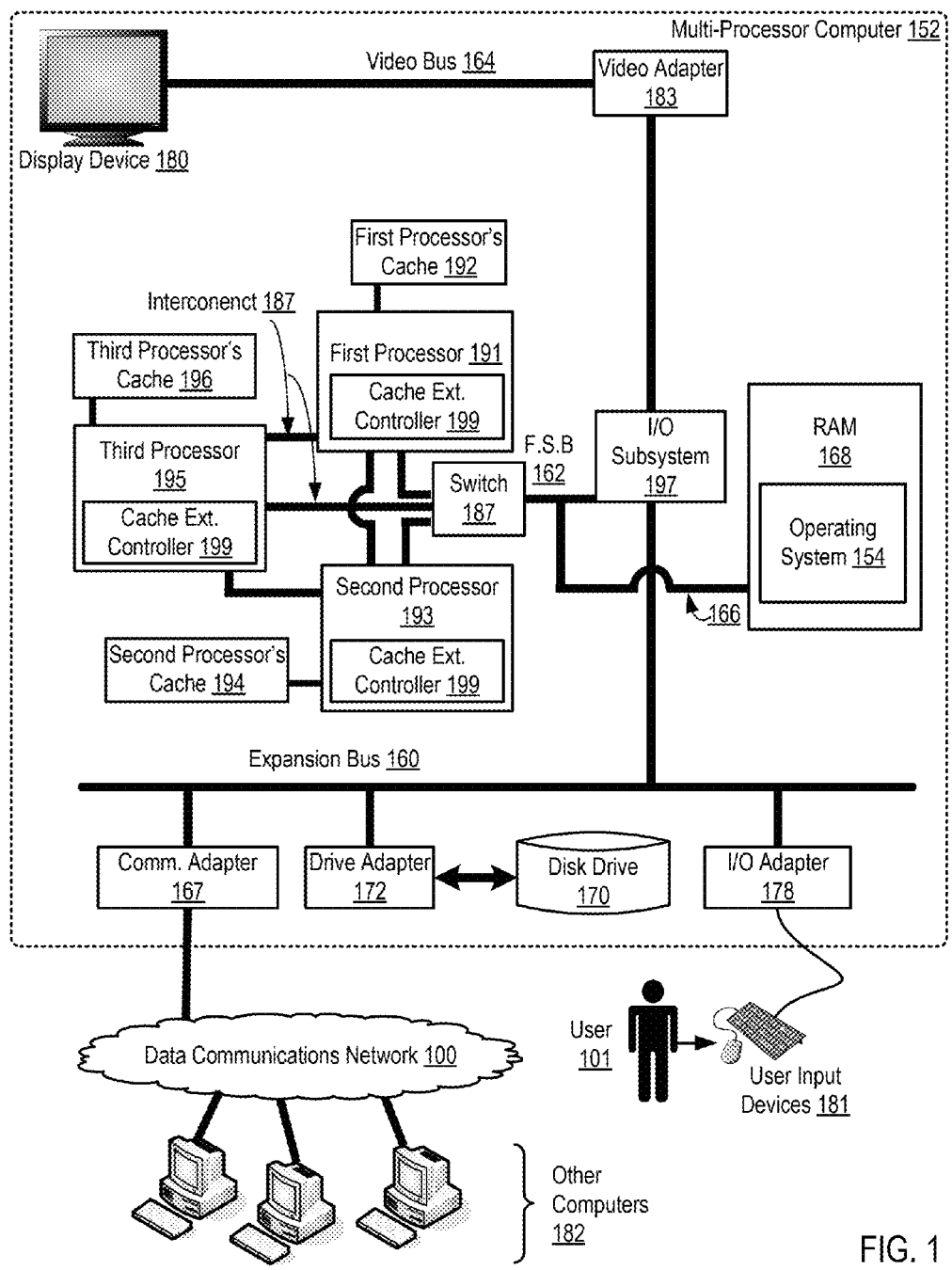
FIG. 1 sets forth a block diagram of automated computing machinery comprising an exemplary multi-processor computer useful in extending cache according to embodiments of the present invention.

Exemplary methods, apparatuses, and computer program products for extending cache in a multi-processor computer in accordance with the present invention are described with reference to the accompanying drawings, beginning with FIG. 1.

Extending cache in a multi-processor computer in accordance with the present invention is generally implemented with computers, that is, with automated computing machinery. FIG. 1 sets forth a block diagram of automated computing machinery comprising an exemplary multi-processor computer (152) useful in extending cache according to embodiments of the present invention. The multi-processor computer (152) of FIG. 1 includes a first processor (191), a second processor (193), and a third processor (195), each of which is coupled together via an interconnect (187). An interconnect may be a high-speed bus that includes point-to-point connections between each of the processors.

The multi-processor computer (152) of FIG. 1 also includes a switch (187) that is coupled to each of the processors (191, 193, 195). The switch (187) of FIG. 1 is also coupled to an input/output (I/O) subsystem (197) and a front side bus (162). The switch (187) is configured to control bus connections between the processors (191, 193, 195) and the front side bus (162) and the I/O subsystem (197). Connections to the front side bus (162) enable a particular processor to access other components of the server (152). For example, the server (152) of FIG. 1 includes random access memory (168) ('RAM') which is connected through a high speed memory bus (166) to the processors (191, 193, 195) and to other components of the server (152).

Each of the processors (191, 193, 195) includes a corresponding cache memory (192, 194, 196). A cache may include high speed random access memory (RAM) modules. Each of the processors (191, 193, 195) also includes a cache extension controller (199). A cache extension controller may include firmware comprising computer program instructions for extending cache in the multi-processor computer in accordance with the present invention.

The cache extension controller (199) enables a particular processor to act as either a processor donating a cache (i.e., a donor processor) or a processor requesting a donor processor's cache (i.e., a requesting processor). Specifically, the cache extension controller (199) includes computer program instructions that when executed by a particular processor cause the processor to carry out the steps of detecting, by a donor processor, nonuse of a donor processor's cache; broadcasting to one or more processors in the multi-processor computer, by the donor processor, a donor-ready message indicating the donor processor's cache is available for ownership transferment; in response to the broadcast of the donor-ready message, receiving from a first requesting processor, by the donor processor, a first ownership-request message requesting ownership of the donor processor's cache by the first requesting processor; in response to receiving the first ownership-request message, transmitting to the first requesting processor, by the donor processor, an ownership-grant message indicating an intention of the donor processor to transfer ownership of the donor processor's cache to the first requesting processor; and in response to transmitting the ownership-grant message, receiving from the first requesting processor, by the donor processor, an ownership-claim message indicating that the first requesting processor intends to claim ownership of the donor processor's cache.

The cache extension controller (199) also includes computer program instructions that when executed by a particular processor cause the processor to carry out the steps of receiving from a donor processor, by a requesting processor, a donor-ready message indicating that a donor processor's cache is available for ownership transferment; in response to receiving the donor-ready message, transmitting to the donor processor, by the requesting processor, an ownership-request message requesting ownership of the donor processor's cache by the requesting processor; in response to transmitting the ownership-request message, receiving, by the requesting processor, an ownership-grant message indicating an intention of the donor processor to transfer ownership of the donor processor's cache to the requesting processor; and in response to receiving the ownership-grant message, transmitting, by the requesting processor, an ownership-claim message indicating that the requesting processor intends to claim ownership of the donor processor's cache.

The processors (191, 193, 195) may be contained within a single processor package, as in a multi-core configuration, or each may be part of a separate processor package, as in a multi-package configuration. In the multi-core configuration, each processor may access the RAM (168) through the switch (187). That is, the RAM (168) may be directly coupled to the switch (187). In the multi-package configuration, however, each processor's cache (192, 194, 196) may be directly coupled (not shown) to the RAM (168). In either configuration, the cache extension controller (199) within each processor is configured for extending cache in the multi-processor computer in accordance with the present invention.

Stored in RAM (168) is an operating system (154). Operating systems useful extending cache in a multi-processor computer according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The multi-processor computer (152) of FIG. 1 includes disk drive adapter (172) coupled through expansion bus (160) and bus adapter (158) to processor (156) and other components of the multi-processor computer (152). Disk drive adapter (172) connects non-volatile data storage to the multi-processor computer (152) in the form of disk drive (170). Disk drive adapters useful in computers for extending cache in a multi-processor computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example multi-processor computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example multi-processor computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

Figure 2:
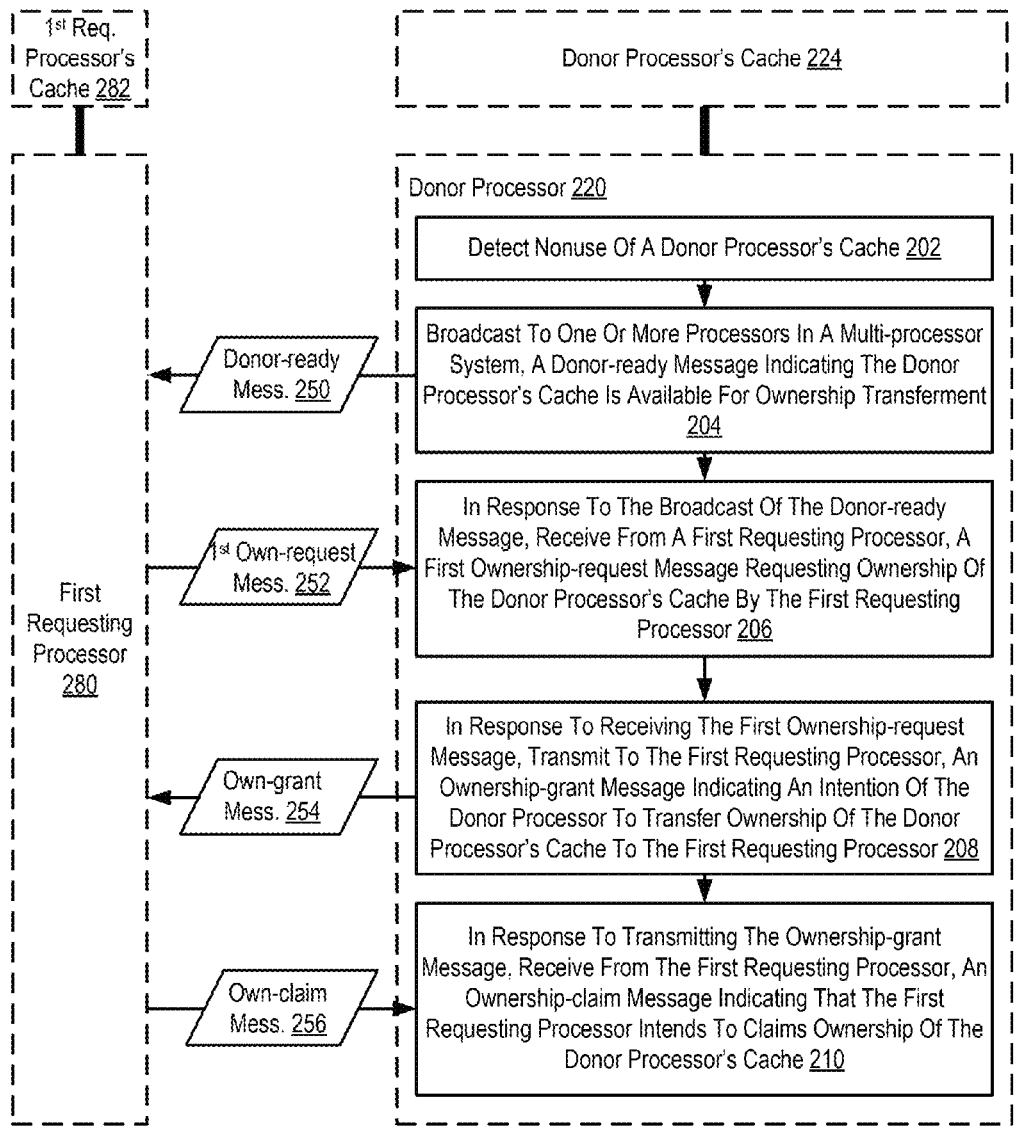
FIG. 2 sets forth a flow chart illustrating an exemplary method for extending cache in a multi-processor computer according to embodiments of the present invention.

The exemplary multi-processor computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for extending cache in a multi-processor computer according to embodiments of the present invention include modems for wired dial-up communications, Ethernet (IEEE 802.3) adapters for wired data communications network communications, and 802.11 adapters for wireless data communications network communications.

For further explanation, FIG. 2 sets forth a flow chart illustrating an exemplary method for extending cache in a multi-processor computer according to embodiments of the present invention. The method of FIG. 2 includes detecting (202), by a donor processor (220), nonuse of a donor processor's cache (224). Each of the processors of the multi-processor computer (152) may include advanced power management features to minimize overall energy costs to the end user, such as placing unused cores into a deep-sleep power state. When in a reduced power state, a processor may not be using an attached cache. Detecting (202), by a donor processor (220), nonuse of a donor processor's cache (224) may be carried out by determining that the processor is preparing to enter a reduced power state and therefore will not be using the donor processor's cache; and detecting reduced access to the donor processor's cache.

The method of FIG. 2 also includes in response to detecting nonuse of the donor processor's cache, broadcasting (204) to one or more processors (280) in the multi-processor computer, by the donor processor (220), a donor-ready message (250). A donor-ready message indicates the donor processor's cache (224) is available for ownership transferment. For example, if the donor processor (220) determines that the donor processor's cache is not being utilized by the donor processor, the donor processor may broadcast the donor-ready message. Broadcasting (204) to one or more processors (280) in the multi-processor computer, by the donor processor (220), a donor-ready message (250) may be carried out by transmitting the donor-ready message (250) to every processor in the multi-processor system over the interconnect (187).

The method of FIG. 2 also includes in response to the broadcast of the donor-ready message (250), receiving (206) from a first requesting processor (280), by the donor processor (220), a first ownership-request message (252) requesting ownership of the donor processor's cache (224) by the first requesting processor (280). In response to receiving a donor-ready message, a receiving processor may determine if the receiving processor could utilize the additional cache space offered by the donor processor. If the receiving processor could utilize the additional space, the receiving processor transmits the ownership-request message, thus making the receiving processor into a 'requesting processor.' Receiving (206) from a first requesting processor (280) a first ownership-request message (252) may be carried out by receiving a message indicating that a requesting processor wishes to acquire ownership of the donor processor's cache.

The method of FIG. 2 includes in response to receiving the first ownership-request message (252), transmitting (208) to the first requesting processor (280), by the donor processor (220), an ownership-grant message (254) indicating an intention of the donor processor (220) to transfer ownership of the donor processor's cache (224) to the first requesting processor (280). Transmitting (208) to the first requesting processor (280), by the donor processor (220), an ownership-grant message (254) may be carried out by transmitting over an interconnect connecting the first requesting processor and the donor processor, the ownership-grant message. The method of FIG. 2 also includes in response to transmitting the ownership-grant message (254), receiving (210) from the first requesting processor (280), by the donor processor (220), an ownership-claim message (256) indicating that the first requesting processor (280) intends to claim ownership of the donor processor's cache (224). Receiving (210) from the first requesting processor (280), by the donor processor (220), an ownership-claim message (256) may be carried out by receiving over the interconnect the ownership-claim message.

Figure 3:
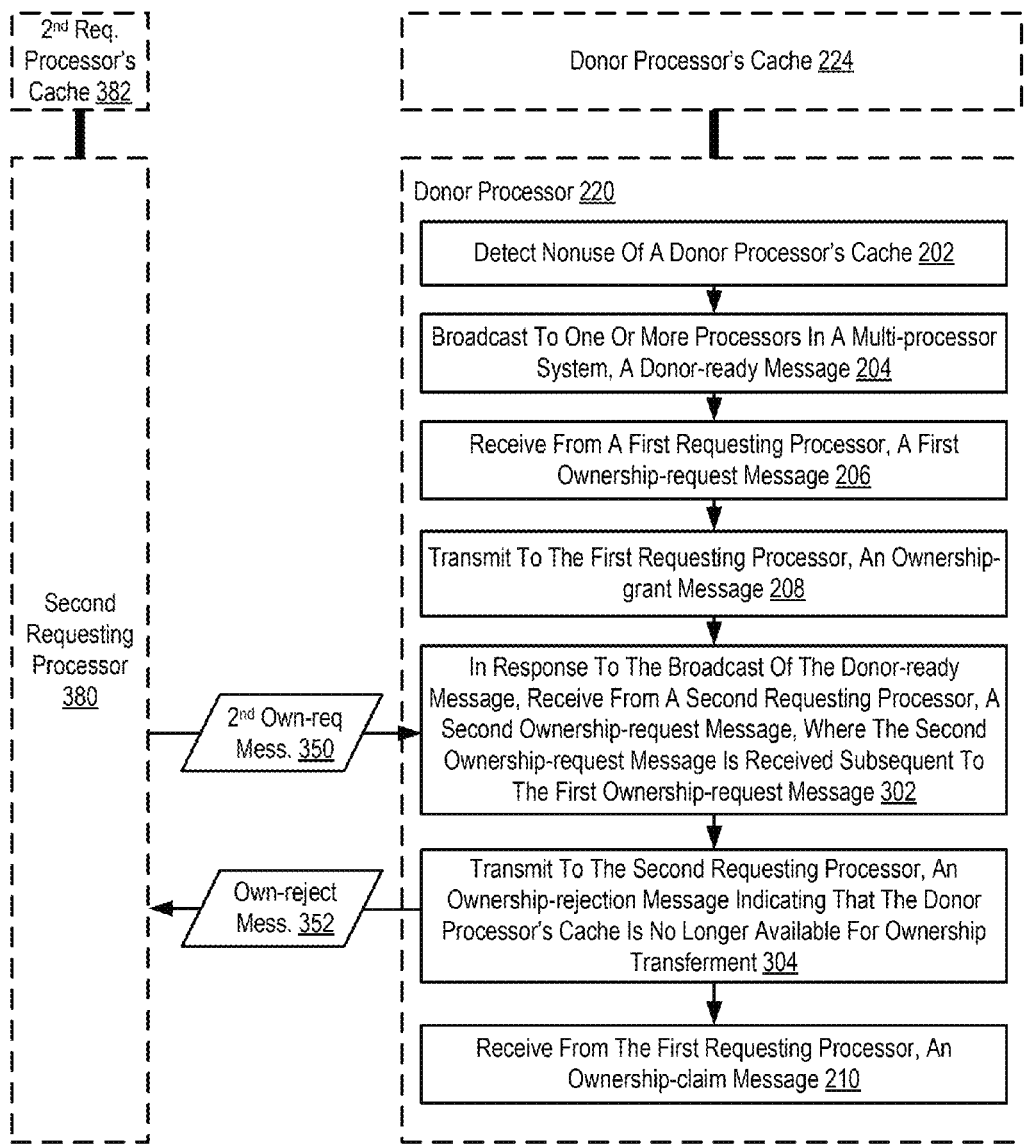
FIG. 3 sets forth a flow chart illustrating a further exemplary method for extending cache in a multi-processor computer according to embodiments of the present invention.

For further explanation, FIG. 3 sets forth a flow chart illustrating a further exemplary method for extending cache in a multi-processor computer according to embodiments of the present invention. The method of FIG. 3 is similar to the method of FIG. 2 in that the method of FIG. 3 includes detecting (202), by a donor processor (220), nonuse of a donor processor's cache (224); broadcasting (204) to one or more processors (280) in the multi-processor computer, a donor-ready message (250) indicating the donor processor's cache (224) is available for ownership transferment; receiving (206) from a first requesting processor (280) a first ownership-request message (252) requesting ownership of the donor processor's cache (224) by the first requesting processor (280); transmitting (208) to the first requesting processor (280), by the donor processor (220), an ownership-grant message (254) indicating an intention of the donor processor (220) to transfer ownership of the donor processor's cache (224) to the first requesting processor (280); and receiving (210) from the first requesting processor (280), an ownership-claim message (256) indicating that the first requesting processor (280) intends to claim ownership of the donor processor's cache (224).

The method of FIG. 3, however, also includes in response to the broadcast of the donor-ready message (250), receiving (302) from a second requesting processor (380), by the donor processor (220), a second ownership-request message (350) where the second ownership-request message (350) is received subsequent to the first ownership-request message (250). Receiving (302) from a second requesting processor (380), by the donor processor (220), a second ownership-request message (350) may be carried out by receiving subsequent to the first ownership message, a second ownership-request message. For example, multiple processors may respond to the donor-ready message. However, in a particular embodiment, only one processor is transferred ownership of the donor processor's cache.

The method of FIG. 3 also includes transmitting (304) to the second requesting processor (380), by the donor processor (220), an ownership-rejection message (352) indicating that the donor processor's cache (224) is no longer available for ownership transferment. Transmitting (304) to the second requesting processor (380), by the donor processor (220), an ownership-rejection message (352) indicating that the donor processor's cache (224) is no longer available for ownership transferment may be carried out by sending the ownership-rejection message if the donor processor has received an earlier ownership-request message from another processor.

Figure 4:
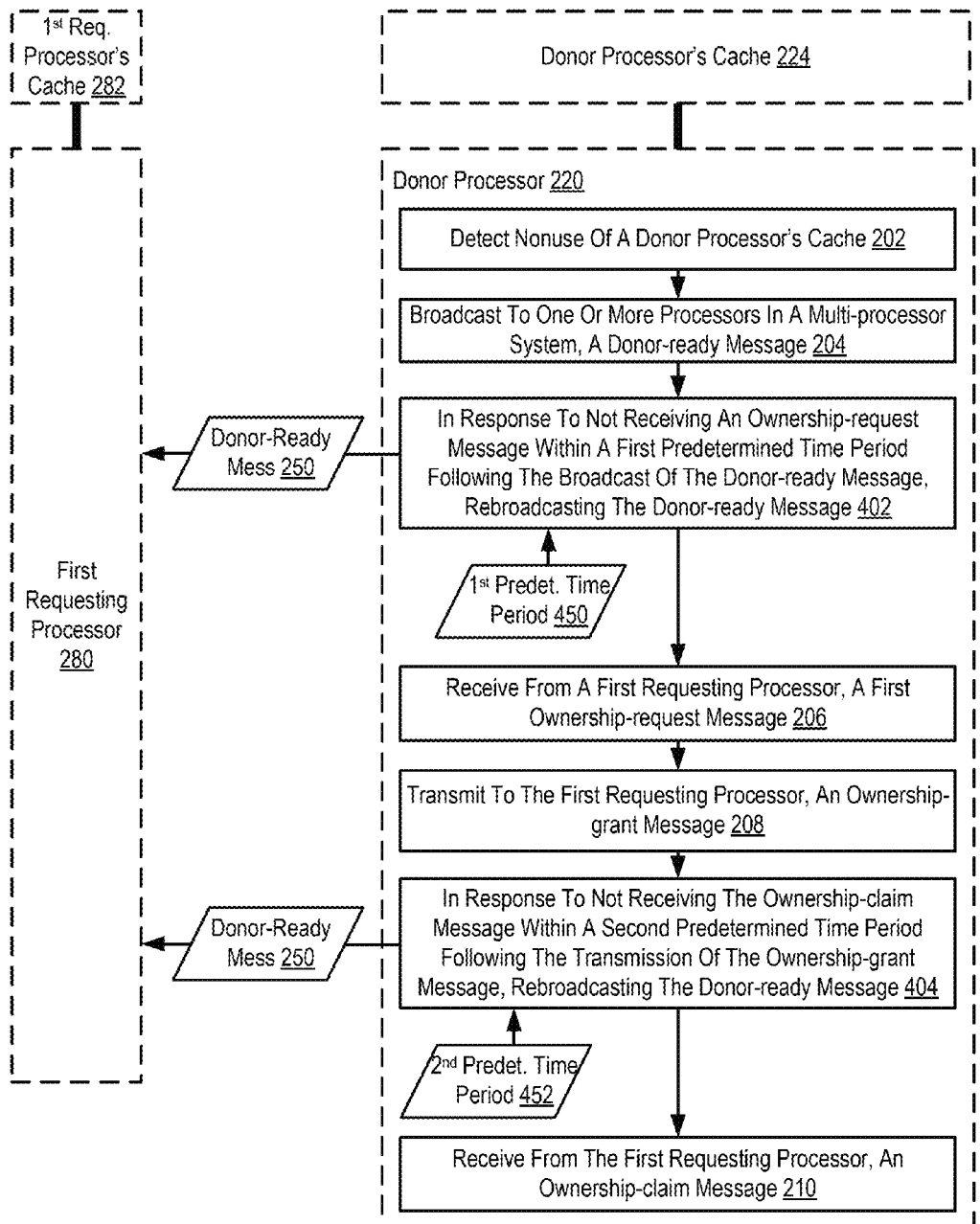
FIG. 4 sets forth a flow chart illustrating a further exemplary method for extending cache in a multi-processor computer according to embodiments of the present invention.

For further explanation, FIG. 4 sets forth a flow chart illustrating a further exemplary method for extending cache in a multi-processor computer according to embodiments of the present invention. The method of FIG. 4 is similar to the method of FIG. 2 in that the method of FIG. 4 includes detecting (202), by a donor processor (220), nonuse of a donor processor's cache (224); broadcasting (204) to one or more processors (280) in the multi-processor computer, a donor-ready message (250) indicating the donor processor's cache (224) is available for ownership transferment; receiving (206) from a first requesting processor (280) a first ownership-request message (252) requesting ownership of the donor processor's cache (224) by the first requesting processor (280); transmitting (208) to the first requesting processor (280), by the donor processor (220), an ownership-grant message (254) indicating an intention of the donor processor (220) to transfer ownership of the donor processor's cache (224) to the first requesting processor (280); and receiving (210) from the first requesting processor (280), an ownership-claim message (256) indicating that the first requesting processor (280) intends to claim ownership of the donor processor's cache (224).

The method of FIG. 4, however, also includes in response to not receiving an ownership-request message (252) within a first predetermined time period (450) following the broadcast (204) of the donor-ready message (250), rebroadcasting (402), by the donor processor (220), the donor-ready message (250). A first predetermined time period may be user configurable and represent a time-out for an offer of ownership of the donor processor's cache to the processors of the multi-processor computer. Rebroadcasting (402), by the donor processor (220), the donor-ready message (250) may be carried out by transmitting the donor-ready message (250) to every processor in the multi-processor system.

The method of FIG. 4 also includes in response to not receiving the ownership-claim message (256) within a second predetermined time period (452) following the transmission (208) of the ownership-grant message (254), rebroadcasting (404), by the donor processor (220), the donor-ready message (250). A second predetermined time period may be user configurable and represent a time-out for an offer of ownership of the donor processor's cache to a particular processor. Rebroadcasting (404), by the donor processor (220), the donor-ready message (250) may be carried out by transmitting the donor-ready message (250) to every processor in the multi-processor system.

Figure 5:
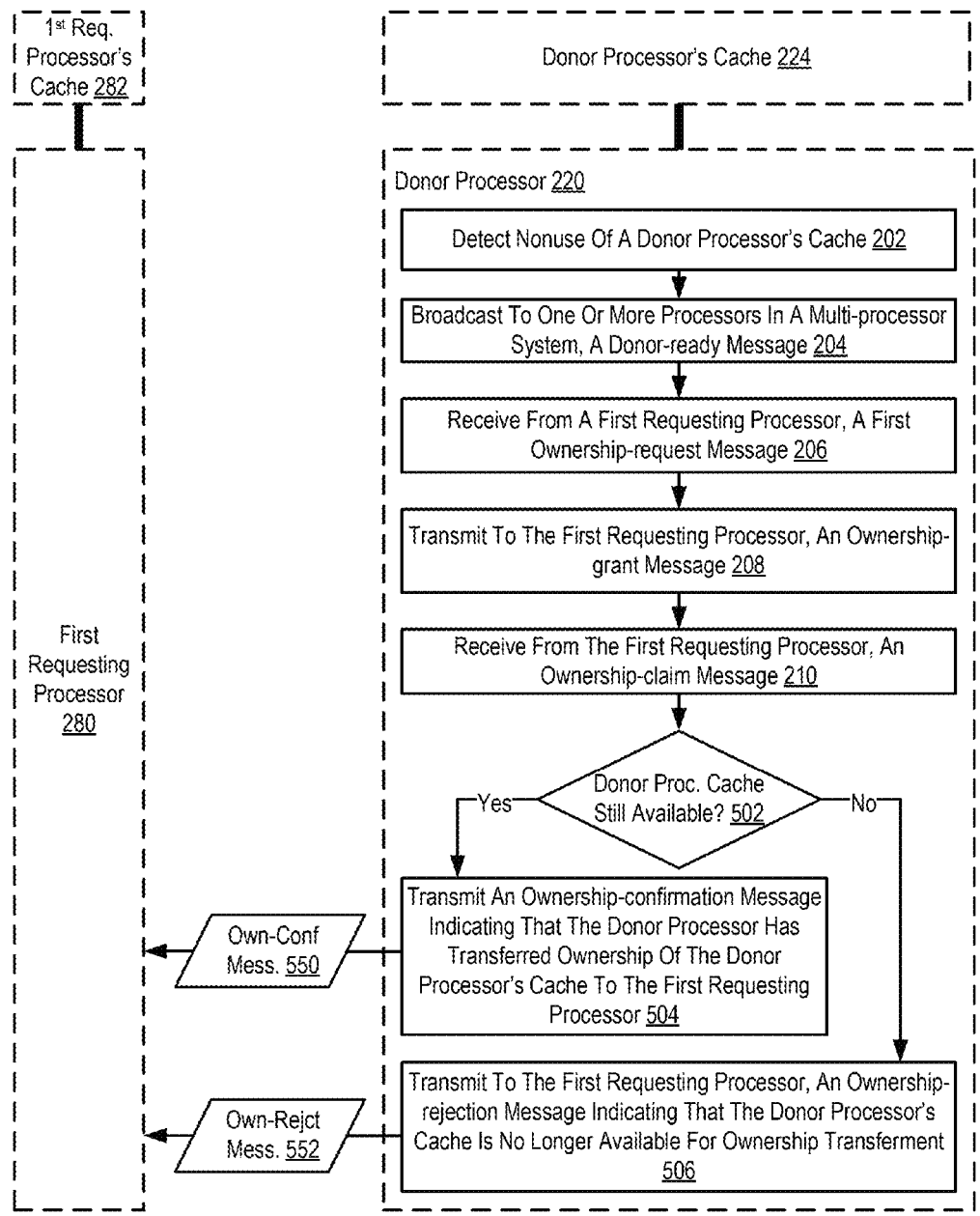
FIG. 5 sets forth a flow chart illustrating a further exemplary method for extending cache in a multi-processor computer according to embodiments of the present invention.

For further explanation, FIG. 5 sets forth a flow chart illustrating a further exemplary method for extending cache in a multi-processor computer according to embodiments of the present invention. The method of FIG. 5 is similar to the method of FIG. 2 in that the method of FIG. 5 includes detecting (202), by a donor processor (220), nonuse of a donor processor's cache (224); broadcasting (204) to one or more processors (280) in the multi-processor computer, a donor-ready message (250) indicating the donor processor's cache (224) is available for ownership transferment; receiving (206) from a first requesting processor (280) a first ownership-request message (252) requesting ownership of the donor processor's cache (224) by the first requesting processor (280); transmitting (208) to the first requesting processor (280), by the donor processor (220), an ownership-grant message (254) indicating an intention of the donor processor (220) to transfer ownership of the donor processor's cache (224) to the first requesting processor (280); and receiving (210) from the first requesting processor (280), an ownership-claim message (256) indicating that the first requesting processor (280) intends to claim ownership of the donor processor's cache (224).

The method of FIG. 5, however, also includes in response to receiving the ownership-claim message (256), determining (502), by the donor processor (220), whether the donor processor's cache (224) is still available for ownership transferment. Determining (502), by the donor processor (220), whether the donor processor's cache (224) is still available for ownership transferment may be carried out by determining if the donor processor is changing from a low power state to a higher power state; determining if the donor processor needs to utilize the donor processor's cache; and examining a donor state of the donor processor's cache.

The method of FIG. 5 also includes if the donor processor's cache (224) is still available for ownership transferment, transmitting (504), by the donor processor (220), an ownership-confirmation message (550) indicating that the donor processor (220) has transferred ownership of the donor processor's cache (224) to the first requesting processor (280). Transmitting (504), by the donor processor (220), an ownership-confirmation message (550) indicating that the donor processor (220) has transferred ownership of the donor processor's cache (224) to the first requesting processor (280) may be carried out by sending the ownership-confirmation message if the donor state of the donor processor's cache is available.

The method of FIG. 5 also includes if the donor processor's cache (224) is not available for ownership transferment, transmitting (506) to the first requesting processor (280), by the donor processor (220), an ownership-rejection message (550) indicating that the donor processor's cache (224) is no longer available for ownership transferment. Transmitting (506) to the first requesting processor (280), by the donor processor (220), an ownership-rejection message (550) indicating that the donor processor's cache (224) is no longer available for ownership transferment may be carried out by determining that the donor processor needs to utilize the donor processor's cache; changing the donor state to unavailable; and sending the ownership-rejection message if the donor state is unavailable.

Figure 6:
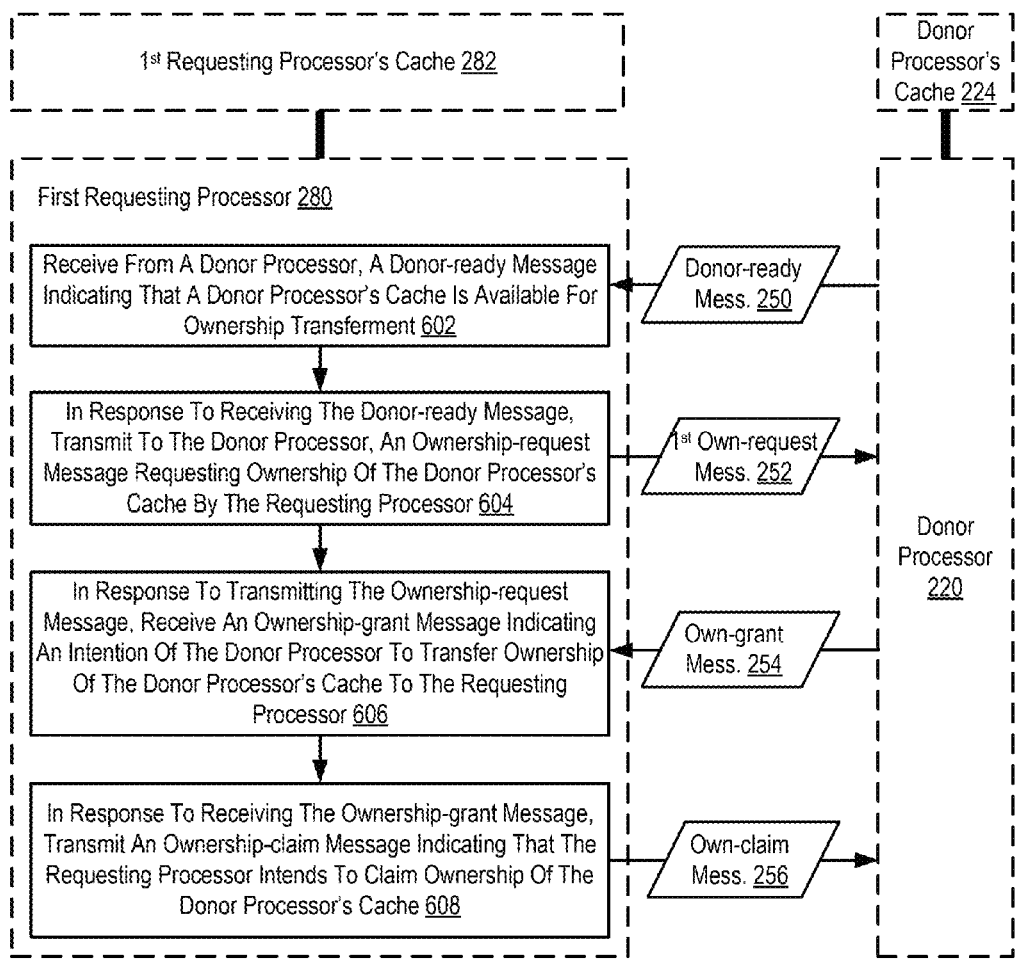
FIG. 6 sets forth a flow chart illustrating a further exemplary method for extending cache in a multi-processor computer according to embodiments of the present invention.

For further explanation, FIG. 6 sets forth a flow chart illustrating a further exemplary method for extending cache in a multi-processor computer according to embodiments of the present invention. The method of FIG. 6 is similar to the method of FIG. 2 in that the method of FIG. 6 also includes a donor-ready message (250); a first ownership-request message (252); an ownership-grant message (254); and an ownership-claim message (256).

The method of FIG. 6 includes receiving (602) from a donor processor (220), by a requesting processor (280), a donor-ready message (250) indicating that the donor processor's cache (224) is available for ownership transferment. A donor-ready message indicates the donor processor's cache (224) is available for ownership transferment. For example, if the donor processor (220) determines that the donor processor's cache is not being utilized by the donor processor, the donor processor may broadcast the donor-ready message. Receiving (602) from a donor processor (220), by a requesting processor (280), a donor-ready message (250) may be carried out by receiving a broadcast message directed at every processor in the multi-processor computer.

The method of FIG. 6 includes in response to receiving the donor-ready message (250), transmitting (604) to the donor processor (220), by the requesting processor (280), an ownership-request message (252) requesting ownership of the donor processor's cache by the requesting processor. In response to receiving a donor-ready message, a receiving processor may determine if the receiving processor could utilize the additional cache space offered by the donor processor. If the receiving processor could utilize the additional space, the receiving processor transmits the ownership-request message, thus making the receiving processor into a requesting processor. Transmitting (604) to the donor processor (220), by the requesting processor (280), an ownership-request message (252) may be carried out by transmitting a message indicating that the requesting processor wishes to acquire ownership of the donor processor's cache.

The method of FIG. 6 includes in response to transmitting the ownership-request message (252), receiving (606), by the requesting processor (280), an ownership-grant message (254) indicating an intention of the donor processor (220) to transfer ownership of the donor processor's cache (224) to the requesting processor (280). Receiving (606), by the requesting processor (280), an ownership-grant message (254) may be carried out by receiving over an interconnect connecting the first requesting processor and the donor processor, the ownership-grant message.

The method of FIG. 6 includes in response to receiving the ownership-grant message (254), transmitting (608), by the requesting processor (280), an ownership-claim message (256) indicating that the requesting processor (280) intends to claim ownership of the donor processor's cache (224). Transmitting (608), by the requesting processor (280), an ownership-claim message (256) may be carried out by transmitting over the interconnect connecting the first requesting processor and the donor processor, the ownership-claim message.

Figure 7:
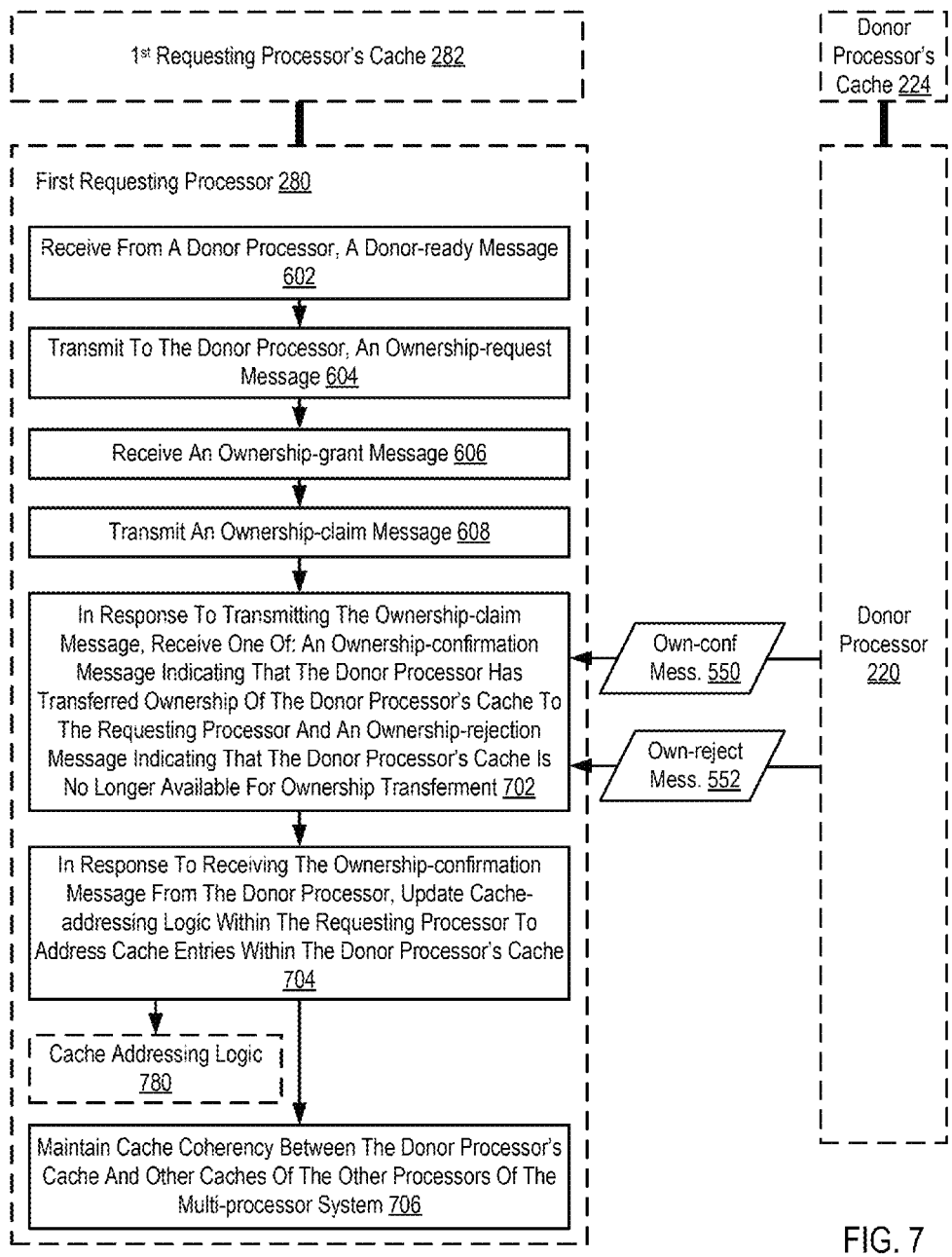
FIG. 7 sets forth a flow chart illustrating a further exemplary method for extending cache in a multi-processor computer according to embodiments of the present invention.

For further explanation, FIG. 7 sets forth a flow chart illustrating a further exemplary method for extending cache in a multi-processor computer according to embodiments of the present invention. The method of FIG. 7 is similar to the method of FIG. 6 in that the method of FIG. 7 also includes receiving (602) from a donor processor (220), by a requesting processor (280), a donor-ready message (250) indicating that the donor processor's cache (224) is available for ownership transferment; in response to receiving the donor-ready message (250), transmitting (604) to the donor processor (220), by the requesting processor (280), an ownership-request message (252) requesting ownership of the donor processor's cache by the requesting processor; in response to transmitting the ownership-request message (252), receiving (606), by the requesting processor (280), an ownership-grant message (254) indicating an intention of the donor processor (220) to transfer ownership of the donor processor's cache (224) to the requesting processor (280); in response to receiving the ownership-grant message (254), transmitting (608), by the requesting processor (280), an ownership-claim message (256) indicating that the requesting processor (280) intends to claim ownership of the donor processor's cache (224).

The method of FIG. 7, however, also includes in response to transmitting the ownership-claim message (256), receiving (702) one of: an ownership-confirmation message (550) indicating that the donor processor (220) has transferred ownership of the donor processor's cache (224) to the requesting processor (280) and an ownership-rejection message (552) indicating that the donor processor's cache (224) is no longer available for ownership transferment. Receiving (702) one of: an ownership-confirmation message (550) and an ownership-rejection message (552) may be carried out by sending the ownership-confirmation message if the donor state of the donor processor's cache is available; and sending the ownership-rejection message if the donor state of the donor processor's cache is unavailable.

The method of FIG. 7 also includes in response to receiving the ownership-confirmation message (550) from the donor processor (220), updating (704), by the requesting processor (280), cache-addressing logic (780) within the requesting processor (280) to address cache entries within the donor processor's cache (224). Cache-addressing logic indicates how the requesting processor references cache entries. Updating (704), by the requesting processor (280), cache-addressing logic (780) within the requesting processor (280) may be carried out by mapping entries of the donor processor's cache within a cache table of the requesting processor.

The method of FIG. 7 also includes maintaining (706), by the requesting processor (280), cache coherency between the donor processor's cache (224) and other caches (199, 194) of the other processors (195, 193) of the multi-processor computer (152). Maintaining (706), by the requesting processor (280), cache coherency between the donor processor's cache (224) and other caches (199, 194) of the other processors (195, 193) of the multi-processor computer (152) may be carried out by updating, by the requesting processor, one or more processor concerning the entries within the donor processor's cache.

Figure 8:
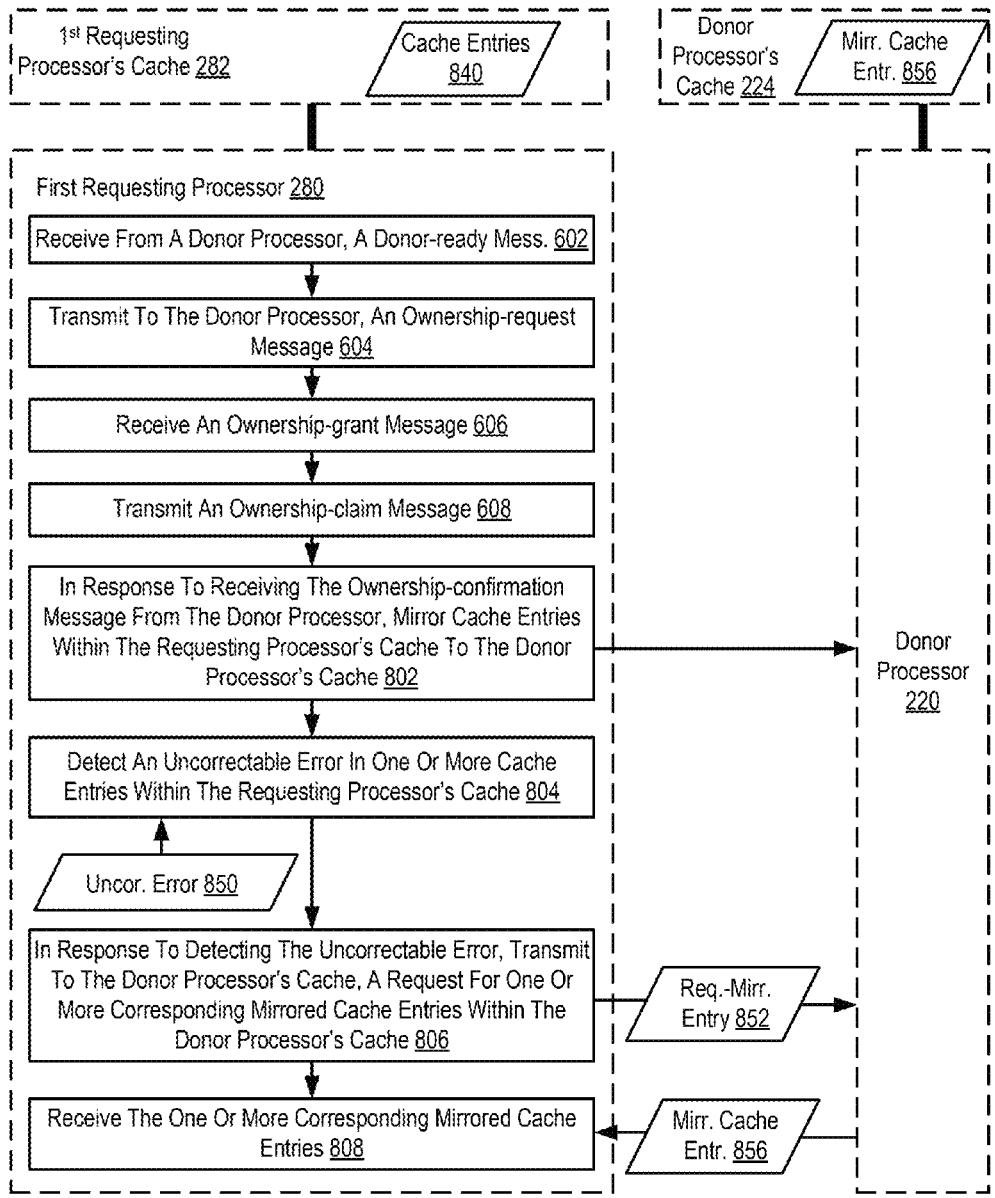
FIG. 8 sets forth a flow chart illustrating a further exemplary method for extending cache in a multi-processor computer according to embodiments of the present invention.

For further explanation, FIG. 8 sets forth a flow chart illustrating a further exemplary method for extending cache in a multi-processor computer according to embodiments of the present invention. The method of FIG. 8 is similar to the method of FIG. 6 in that the method of FIG. 8 also includes: receiving (602) from a donor processor (220), by a requesting processor (280), a donor-ready message (250) indicating that the donor processor's cache (224) is available for ownership transferment; in response to receiving the donor-ready message (250), transmitting (604) to the donor processor (220), by the requesting processor (280), an ownership-request message (252) requesting ownership of the donor processor's cache by the requesting processor; in response to transmitting the ownership-request message (252), receiving (606), by the requesting processor (280), an ownership-grant message (254) indicating an intention of the donor processor (220) to transfer ownership of the donor processor's cache (224) to the requesting processor (280); in response to receiving the ownership-grant message (254), transmitting (608), by the requesting processor (280), an ownership-claim message (256) indicating that the requesting processor (280) intends to claim ownership of the donor processor's cache (224).

The method of FIG. 8, however, also includes in response to receiving the ownership-confirmation message (550) from the donor processor (220), mirroring (802), by the requesting processor (280), cache entries (840) within the requesting processor's cache (282) to the donor processor's cache (224). Mirroring (802), by the requesting processor (280), cache entries (840) within the requesting processor's cache (282) to the donor processor's cache (224) may be carried out by transmitting cache entries from the requesting processor's cache to the donor processor's cache; and updating cache entries within the donor processor's cache in response to changes within the requesting processor's cache.

The method of FIG. 8 also includes detecting (804), by the requesting processor (280), an uncorrectable error (850) in one or more cache entries (840) within the requesting processor's cache (282). An uncorrectable error may be an error with more than one error. Detecting (804), by the requesting processor (280), an uncorrectable error (850) in one or more cache entries (840) within the requesting processor's cache (282) may be carried out by retrieving cache entries from the requesting processor's cache; examining error correction data within the retrieved cache entries; and determining that the detected error is uncorrectable.

The method of FIG. 8 includes in response to detecting the uncorrectable error (850), transmitting (806) to the donor processor's cache (224), by the requesting processor (280), a request (852) for one or more corresponding mirrored cache entries (856) within the donor processor's cache (224). Transmitting (806) to the donor processor's cache (224), by the requesting processor (280), a request (852) for one or more corresponding mirrored cache entries (856) within the donor processor's cache (224) may be carried out by transmitting a request-mirror entry from the donor processor's cache. A request-mirror entry may specify the specific cache entry needed from the donor processor's cache.

The method of FIG. 8 includes receiving (808), by the requesting processor (280), the one or more corresponding mirrored cache entries (856). Receiving (808), by the requesting processor (280), the one or more corresponding mirrored cache entries (856) may be carried out by receiving the requested cache entry over the interconnect connecting the requesting processor and the donor processor.

Figure 9:
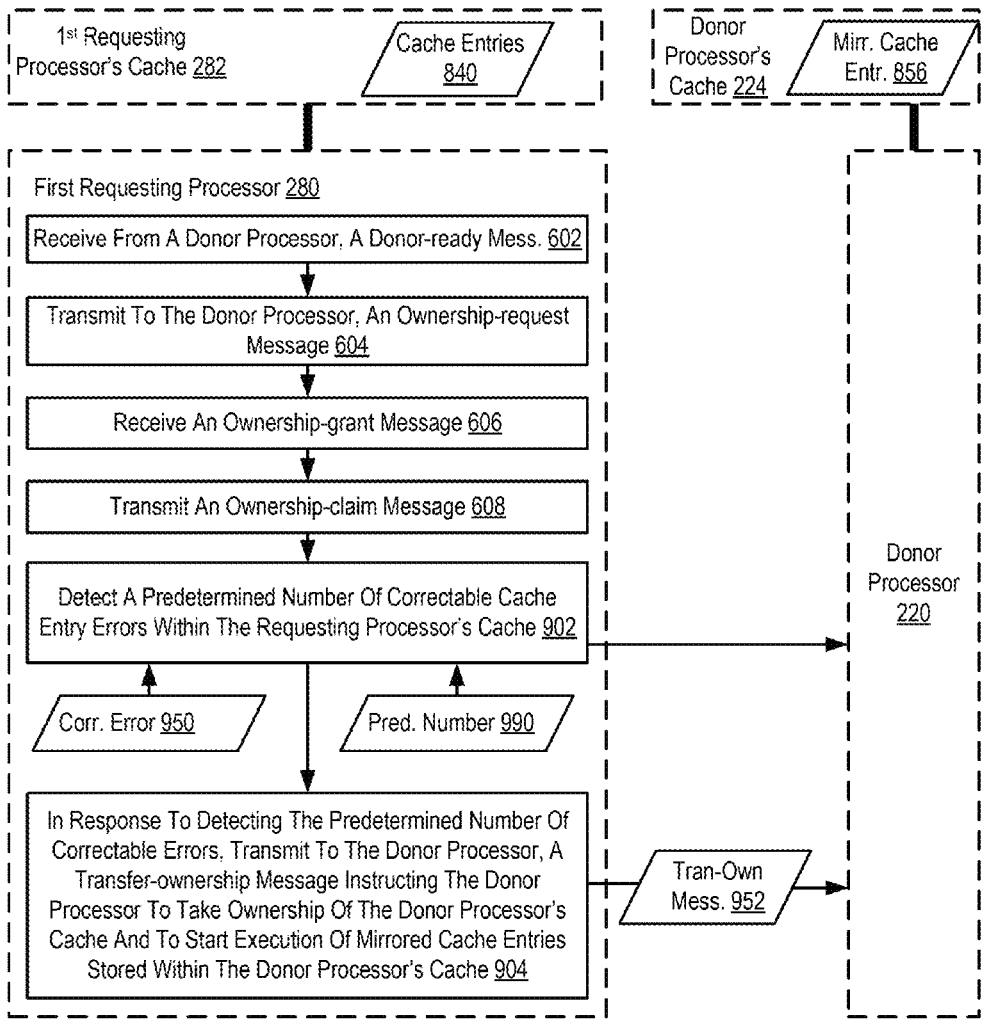
FIG. 9 sets forth a flow chart illustrating a further exemplary method for extending cache in a multi-processor computer according to embodiments of the present invention.

For further explanation, FIG. 9 sets forth a flow chart illustrating a further exemplary method for extending cache in a multi-processor computer according to embodiments of the present invention. The method of FIG. 9 is similar to the method of FIG. 6 in that the method of FIG. 9 also includes: receiving (602) from a donor processor (220), by a requesting processor (280), a donor-ready message (250) indicating that the donor processor's cache (224) is available for ownership transferment; in response to receiving the donor-ready message (250), transmitting (604) to the donor processor (220), by the requesting processor (280), an ownership-request message (252) requesting ownership of the donor processor's cache by the requesting processor; in response to transmitting the ownership-request message (252), receiving (606), by the requesting processor (280), an ownership-grant message (254) indicating an intention of the donor processor (220) to transfer ownership of the donor processor's cache (224) to the requesting processor (280); in response to receiving the ownership-grant message (254), transmitting (608), by the requesting processor (280), an ownership-claim message (256) indicating that the requesting processor (280) intends to claim ownership of the donor processor's cache (224).

The method of FIG. 9, however, also includes detecting (902), by the requesting processor (280), a predetermined number (990) of correctable cache entry errors (950) within the requesting processor's cache (282). A predetermined number of errors may be user configurable and set to indicate the number of errors before the requesting processor's cache is deemed too unreliable. Detecting (902), by the requesting processor (280), a predetermined number (990) of correctable cache entry errors (950) within the requesting processor's cache (282) may be carried out by tracking the number of correctable cache entry errors.

The method of FIG. 9 includes in response to detecting the predetermined number (990) of correctable errors (950), transmitting (904) to the donor processor (220), by the requesting processor (280), a transfer-ownership message (952) instructing the donor processor (220) to take ownership of the donor processor's cache (224) and to start execution of mirrored cache entries (856) stored within the donor processor's cache (224). That is, when the requesting processor's cache is deemed unreliable, because the donor processor's cache included the mirror cache entries of the requesting processor's cache, the donor processor may take over the requesting processor's executions by executing the mirrored cache entries. Transmitting (904) to the donor processor (220), by the requesting processor (280), a transfer-ownership message (952) instructing the donor processor (220) to take ownership of the donor processor's cache (224) and to start execution of mirrored cache entries (856) stored within the donor processor's cache (224) may be carried out by transmitting over the interconnect connecting the donor processor and the requesting processor.

Exemplary embodiments of the present invention are described largely in the context of a fully functional computer system for extending cache in a multi-processor computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of extending cache in a multi-processor computer, the method comprising:
   detecting, by a donor processor, nonuse of a donor processor's cache;
   in response to detecting the nonuse, broadcasting to one or more processors in the multi-processor computer, by the donor processor, a donor-ready message indicating the donor processor's cache is available for ownership transferment;
   in response to the broadcast of the donor-ready message, receiving from a first requesting processor, by the donor processor, a first ownership-request message requesting ownership of the donor processor's cache by the first requesting processor;
   in response to receiving the first ownership-request message, transmitting to the first requesting processor, by the donor processor, an ownership-grant message indicating an intention of the donor processor to transfer ownership of the donor processor's cache to the first requesting processor; and
   in response to transmitting the ownership-grant message, receiving from the first requesting processor, by the donor processor, an ownership-claim message indicating that the first requesting processor intends to claim ownership of the donor processor's cache.

2. The method of claim 1 further comprising:
   in response to the broadcast of the donor-ready message, receiving from a second requesting processor, by the donor processor, a second ownership-request message, wherein the second ownership-request message is received subsequent to the first ownership-request message; and
   transmitting to the second requesting processor, by the donor processor, an ownership-rejection message indicating that the donor processor's cache is no longer available for ownership transferment.

3. The method of claim 1 further comprising in response to not receiving an ownership-request message within a first predetermined time period following the broadcast of the donor-ready message, rebroadcasting, by the donor processor, the donor-ready message.

4. The method of claim 1 further comprising in response to not receiving the ownership-claim message within a second predetermined time period following the transmission of the ownership-grant message, rebroadcasting, by the donor processor, the donor-ready message.

5. The method of claim 1 further comprising:
   in response to receiving the ownership-claim message, determining, by the donor processor, whether the donor processor's cache is still available for ownership transferment;
   if the donor processor's cache is still available for ownership transferment, transmitting, by the donor processor, an ownership-confirmation message indicating that the donor processor has transferred ownership of the donor processor's cache to the first requesting processor; and
   if the donor processor's cache is not available for ownership transferment, transmitting to the first requesting processor, by the donor processor, an ownership-rejection message indicating that the donor processor's cache is no longer available for ownership transferment.

6. A method of extending cache in a multi-processor computer, the method comprising:
   receiving from a donor processor, by a requesting processor, a donor-ready message indicating that a donor processor's cache is available for ownership transferment;
   in response to receiving the donor-ready message, transmitting to the donor processor, by the requesting processor, an ownership-request message requesting ownership of the donor processor's cache by the requesting processor;
   in response to transmitting the ownership-request message, receiving, by the requesting processor, an ownership-grant message indicating an intention of the donor processor to transfer ownership of the donor processor's cache to the requesting processor; and
   in response to receiving the ownership-grant message, transmitting, by the requesting processor, an ownership-claim message indicating that the requesting processor intends to claim ownership of the donor processor's cache.

7. The method of claim 6 further comprising in response to transmitting the ownership-claim message, receiving one of: an ownership-confirmation message indicating that the donor processor has transferred ownership of the donor processor's cache to the requesting processor and an ownership-rejection message indicating that the donor processor's cache is no longer available for ownership transferment.

8. The method of claim 7 further comprising: in response to receiving the ownership-confirmation message from the donor processor, updating, by the requesting processor, cache-addressing logic within the requesting processor to address cache entries within the donor processor's cache.

9. The method of claim 7 further comprising: in response to receiving the ownership-confirmation message from the donor processor, mirroring, by the requesting processor, cache entries within the requesting processor's cache to the donor processor's cache.

10. The method of claim 9 further comprising:
   detecting, by the requesting processor, an uncorrectable error in one or more cache entries within the requesting processor's cache;
   in response to detecting the uncorrectable error, transmitting to the donor processor's cache, by the requesting processor, a request for one or more corresponding mirrored cache entries within the donor processor's cache; and
   receiving, by the requesting processor, the one or more corresponding mirrored cache entries.

11. The method of claim 9 further comprising:
   detecting, by the requesting processor, a predetermined number of correctable cache entry errors within the requesting processor's cache; and
   in response to detecting the predetermined number of correctable errors, transmitting to the donor processor, by the requesting processor, a transfer-ownership message instructing the donor processor to take ownership of the donor processor's cache and to start execution of mirrored cache entries stored within the donor processor's cache.

12. The method of claim 6 further comprising maintaining, by the requesting processor, cache coherency between the donor processor's cache and other caches of the other processors of the multi-processor computer.

13. An apparatus for extending cache in a multi-processor computer, the apparatus comprising a computer processor, a computer memory operatively coupled to the computer processor, the computer memory having disposed within it computer program instructions that when executed by the computer processor cause the apparatus to carry out the steps of:
   detecting, by a donor processor, nonuse of a donor processor's cache;
   in response to detecting the nonuse, broadcasting to one or more processors in the multi-processor computer, by the donor processor, a donor-ready message indicating the donor processor's cache is available for ownership transferment;
   in response to the broadcast of the donor-ready message, receiving from a first requesting processor, by the donor processor, a first ownership-request message requesting ownership of the donor processor's cache by the first requesting processor;
   in response to receiving the first ownership-request message, transmitting to the first requesting processor, by the donor processor, an ownership-grant message indicating an intention of the donor processor to transfer ownership of the donor processor's cache to the first requesting processor; and
   in response to transmitting the ownership-grant message, receiving from the first requesting processor, by the donor processor, an ownership-claim message indicating that the first requesting processor intends to claim ownership of the donor processor's cache.

14. The apparatus of claim 13 further comprising computer program instructions that when executed by the computer processor cause the apparatus to carry out the steps of:
   in response to the broadcast of the donor-ready message, receiving from a second requesting processor, by the donor processor, a second ownership-request message, wherein the second ownership-request message is received subsequent to the first ownership-request message; and
   transmitting to the second requesting processor, by the donor processor, an ownership-rejection message indicating that the donor processor's cache is no longer available for ownership transferment.

15. The apparatus of claim 13 further comprising computer program instructions that when executed by the computer processor cause the apparatus to carry out the steps of in response to not receiving an ownership-request message within a first predetermined time period following the broadcast of the donor-ready message, rebroadcasting, by the donor processor, the donor-ready message.

16. The apparatus of claim 13 further comprising computer program instructions that when executed by the computer processor cause the apparatus to carry out the steps of in response to not receiving the ownership-claim message within a second predetermined time period following the transmission of the ownership-grant message, rebroadcasting, by the donor processor, the donor-ready message.

17. The apparatus of claim 13 further comprising computer program instructions that when executed by the computer processor cause the apparatus to carry out the steps of:
   in response to receiving the ownership-claim message, determining, by the donor processor, whether the donor processor's cache is still available for ownership transferment;
   if the donor processor's cache is still available for ownership transferment, transmitting, by the donor processor, an ownership-confirmation message indicating that the donor processor has transferred ownership of the donor processor's cache to the first requesting processor; and
   if the donor processor's cache is not available for ownership transferment, transmitting to the first requesting processor, by the donor processor, an ownership-rejection message indicating that the donor processor's cache is no longer available for ownership transferment.

18. A computer program product for extending cache in a multi-processor computer, the computer program product disposed upon a computer readable medium, wherein the computer readable medium is not a signal, the computer program product comprising computer program instructions capable, when executed, of causing a computer to carry out the steps of:
   detecting, by a donor processor, nonuse of a donor processor's cache;
   in response to detecting the nonuse, broadcasting to one or more processors in the multi-processor computer, by the donor processor, a donor-ready message indicating the donor processor's cache is available for ownership transferment;
   in response to the broadcast of the donor-ready message, receiving from a first requesting processor, by the donor processor, a first ownership-request message requesting ownership of the donor processor's cache by the first requesting processor;
   in response to receiving the first ownership-request message, transmitting to the first requesting processor, by the donor processor, an ownership-grant message indicating an intention of the donor processor to transfer ownership of the donor processor's cache to the first requesting processor; and
   in response to transmitting the ownership-grant message, receiving from the first requesting processor, by the donor processor, an ownership-claim message indicating that the first requesting processor intends to claim ownership of the donor processor's cache.

19. The computer program product of claim 18 further comprising computer program instructions capable, when executed, of causing a computer to carry out the steps of:
- in response to the broadcast of the donor-ready message, receiving from a second requesting processor, by the donor processor, a second ownership-request message, wherein the second ownership-request message is received subsequent to the first ownership-request message; and
- transmitting to the second requesting processor, by the donor processor, an ownership-rejection message indicating that the donor processor's cache is no longer available for ownership transferment.

20. The computer program product of claim 18 further comprising computer program instructions capable, when executed, of causing a computer to carry out the steps of in response to not receiving an ownership-request message within a first predetermined time period following the broadcast of the donor-ready message, rebroadcasting, by the donor processor, the donor-ready message.

21. The computer program product of claim 18 further comprising computer program instructions capable, when executed, of causing a computer to carry out the steps of in response to not receiving the ownership-claim message within a second predetermined time period following the transmission of the ownership-grant message, rebroadcasting, by the donor processor, the donor-ready message.

22. The computer program product of claim 18 further comprising computer program instructions capable, when executed, of causing a computer to carry out the steps of:
- in response to receiving the ownership-claim message, determining, by the donor processor, whether the donor processor's cache is still available for ownership transferment;
- if the donor processor's cache is still available for ownership transferment, transmitting, by the donor processor, an ownership-confirmation message indicating that the donor processor has transferred ownership of the donor processor's cache to the first requesting processor; and
- if the donor processor's cache is not available for ownership transferment, transmitting to the first requesting processor, by the donor processor, an ownership-rejection message indicating that the donor processor's cache is no longer available for ownership transferment.

\* \* \* \* \*